DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 24, 1970

872 O.G. 1051

T872,008
COMPOSITE ASSEMBLIES INCORPORATING ALKYLIDENE BISPHENOL POLYESTERS

Winston J. Jackson, Jr., and John R. Caldwell, both of P.O. Box 511, Kingsport, Tenn. 37662

Continuation of application Ser. No. 562,499, July 5, 1966. This application Oct. 20, 1969, Ser. No. 867,967
Int. Cl. B32b *27/36;* C09j *3/14*
U.S. Cl. 161—231
No Drawing. 16 Pages Specification

A composite assembly comprising at least two structural members bonded together by an adhesive member composed essentially of a polymer of at least one dicarboxylic acid and at least 50 mole percent of an alkylidene bisphenol.